March 25, 1924.
H. P. STEVENS
PACKING RING
Filed Dec. 10, 1919
1,488,296
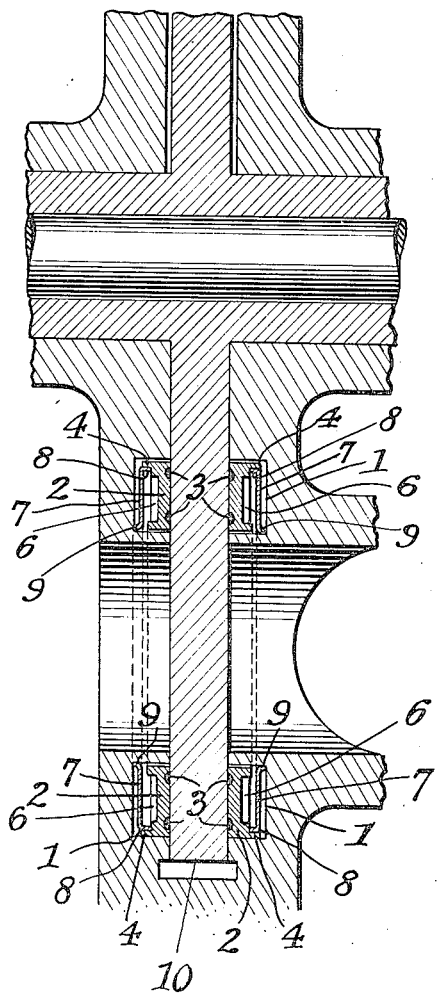
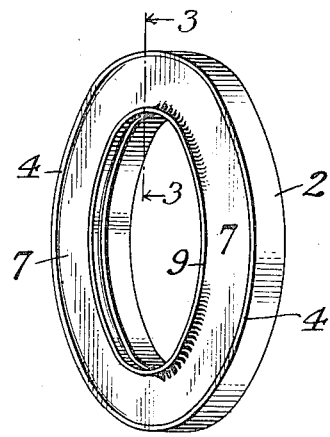
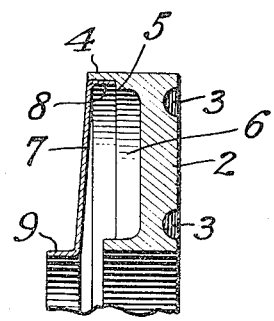
INVENTOR,
Harry P. Stevens.
By Sheffield & Betts
his Attorneys.

Patented Mar. 25, 1924.

1,488,296

UNITED STATES PATENT OFFICE.

HARRY P. STEVENS, OF NEW YORK, N. Y., ASSIGNOR TO STEVENS MOTORS, INC., OF NEW YORK, N. Y., A CORPORATION OF NEW YORK.

PACKING RING.

Original application filed July 8, 1919, Serial No. 309,327. Divided and this application filed December 10, 1919. Serial No. 343,899.

*To all whom it may concern:*

Be it known that I, HARRY P. STEVENS, a citizen of the United States, residing in the borough of Manhattan, city, county, and State of New York, have invented certain new and useful Improvements in Packing Rings, of which the following is a full, clear, and complete description.

This invention relates to improvements in the movable contacting parts of internal combustion engines and similar devices where an especially tight, durable and efficient packing is required between contacting parts under the action of internal fluid pressure.

This application is a division of my prior application Serial No. 309,327 filed July 8, 1919, which has resulted in Patent No. 1,385,099, dated July 19, 1921 for internal combustion engines, in which I have described and claimed various improvements in the operating parts of such engines.

The main object of this invention is to produce a simple, efficient and gas tight packing between disk and other similar valves and the housings thereof so that the contact between the same is made gas tight without the production of undue friction.

For a detailed description of one embodiment of my invention which I at present deem preferable, reference may be had to the following specification and to the accompanying drawing forming a part thereof in which—

Fig. 1 is a sectional view through one-half of a disk valve of an internal combustion engine, showing the details of the improved packing ring applied thereto;

Fig. 2 is a perspective view of one of the packing rings, and

Fig. 3 is a sectional view taken substantially on the line 3—3 of Fig 2.

Within the groove 1, Fig. 1, is placed the packing ring whose construction is indicated in detail in Figs. 2 and 3. The packing ring comprises a steel ring 2 which is shown substantially flat on the side which contacts with the valve disk 10, but which may be otherwise shaped to engage its contacting surface and is preferably provided with oil grooves 3, as indicated in Fig. 3. The opposite side of the ring 2 is recessed in the form of a circular groove, thereby forming an outer cylindrical flange 4 and an internal annular seat 5. The central portion of the annular groove may be further depressed, as indicated at 6, in order to reduce the thickness of the valve ring to the desired amount. Within the cylindrical flange 4 and resting upon the annular seat 5 is an annular ring 7 of comparatively thin resilient material, such as bronze or other preferred metal. This annular ring is provided with two marginal flanges extending in opposite directions from the surface of the ring, the outer marginal flange 8 telescoping with or overlapping the flange 4 of the groove in the ring 2 with a fluid tight spring contact, and the inner flange 9 resting on the side and bottom of the groove 1 in the engine casing. The resiliency of the annular ring 7 forces the steel contact ring 2 against the face of the disk 10 under normal conditions. When the pressure increases within the combustion chamber or port during the compression stroke and the ignition stroke of the piston, any gases leaking between the surface of the valve disk 10 and the margin of the port will immediately increase the pressure between the grooved ring 2 and the resilient ring 7, thereby tending to force the ring 2 more positively toward the valve disk and at the same time will tend to make the contact between the flange 9 and the side of the groove 1 more positive. Furthermore, the pressure upon said flange 9, caused by the resiliency of the metal of the ring 7, will tend to expand the flange 8 and make a tight joint between the same and the cylindrical flange 4 of the ring 2. Thus it will be seen that the valve ring is of unusual efficiency in preventing the passage of air or gases at the time of the greatest pressure in the combustion chamber, while at other times the friction contact with the valve disk is so slight as not to produce any considerable frictional drag on the valve disks themselves.

I do not wish to be understood that the use of the above described packing rings is limited to the particular use herein stated, for said packing rings may be adapted to a variety of other apparatus without departing from the scope of this feature of my invention.

Having thus described one embodiment of my invention what I claim and desire to protect by Letters Patent is:

1. A packing comprising, a stiff annular bearing ring, and a second resilient annular ring, substantially parallel with and spaced therefrom, said rings having parts which telescope with each other at adjacent margins so as to form a fluid tight joint between them, the resiliency of said second ring being adapted to maintain said bearing ring in position on its opposed bearing surface under spring pressure.

2. A packing comprising, a bearing ring having an annular recess therein forming a marginal flange, and a resilient annular ring having a laterally extending marginal flange telescoping with said first named flange and forming a fluid tight joint between said rings, said resilient ring being adapted to force said bearing ring against an opposed bearing member under spring pressure.

3. A packing comprising, a bearing ring having an annular recess therein forming an outer marginal flange, and a resilient annular ring having an outer marginal flange telescoping with said first named flange and forming a fluid tight joint between said rings, said resilient ring being adapted to force said bearing ring against an opposed bearing member under spring pressure.

4. A packing comprising, an annular bearing ring, having a lateral marginal flange, and a resilient annular ring having an outer lateral marginal flange contacting with said first named flange to form an internal chamber and adapted to force the first named ring toward the part with which it is designed to contact under spring pressure.

5. A packing comprising a ring having a lateral marginal flange extending from one side thereof and a resilient annular ring having an outer marginal flange adapted to contact with the first named flange internally and having an inner marginal flange extending in the opposite direction relative to said outer flange, whereby said resilient ring is adapted to force the first named ring toward the part with which it is designed to contact, under spring pressure.

6. A packing comprising a ring having a circular recess therein forming a projecting flange and a resilient annular ring having a lateral marginal flange contacting with the first named flange concentrically and having another marginal flange extending in the opposite direction, whereby said resilient ring is adapted to force said first named ring toward the part with which it is designed to contact under spring pressure.

7. In combination with a supporting part, a packing ring carried by said part and comprising a stiff annular bearing ring and a substantially parallel resilient annular ring positively contacting therewith at its adjacent margin to form an annular chamber, said resilient ring having fluid tight engagement with said part and adapted to force the first named ring outward under spring pressure.

8. In combination with a supporting part, a packing ring carried by said part comprising a stiff annular bearing ring and a substantially parallel resilient annular ring positively contacting therewith at its adjacent margin to form an annular chamber, said resilient ring having a marginal flange adapted to be seated on said part and forming a fluid-tight engagement therewith, said resilient ring being adapted to force the first-named ring outward under spring pressure.

9. In combination with a supporting part, a removable packing ring carried by said part comprising a stiff metallic annular ring and a resilient thin annular ring connected with the first-named ring at one margin thereof and adapted to contact with said part with a fluid-tight joint and to force the first-named ring outward under spring pressure.

10. A packing ring comprising a stiff unyielding annular ring having an inner recess on one side to form an outer marginal flange, and a substantially parallel annular ring spaced therefrom and having an outer lateral marginal flange contacting with said first-named flange concentrically, a casing in which said resilient ring is carried, and means at the inner margin of said resilient ring for making fluid-tight contact between the same and said casing.

11. A removable packing ring adapted to be fixed on a suitable support comprising a stiff metallic annular ring and a resilient thin annular ring united with the first-named ring at its outer margin and adapted to be held in position on said supporting part to force said first-named ring outward toward the part with which it is designed to contact under spring pressure, and means for producing a fluid-tight joint between the inner margin of said ring and said support.

Signed at New York, N. Y., this 8th day of December, 1919.

HARRY P. STEVENS.